United States Patent

Haas et al.

[11] Patent Number: 6,037,926
[45] Date of Patent: *Mar. 14, 2000

[54] EMULATION OF COMPUTER MONITOR IN A WIDE SCREEN TELEVISION

[75] Inventors: Kenneth John Haas, Indianapolis, Ind.; Theodore Frederick Simpson, Lancaster, Pa.

[73] Assignee: Thomson Consumer Electronics, Inc., Indianapolis, Ind.

[*] Notice: This patent issued on a continued prosecution application filed under 37 CFR 1.53(d), and is subject to the twenty year patent term provisions of 35 U.S.C. 154(a)(2).

[21] Appl. No.: 08/342,412

[22] Filed: Nov. 18, 1994

[51] Int. Cl.$^7$ ........................................................ G09G 5/00
[52] U.S. Cl. ........................... 345/132; 345/127; 345/213
[58] Field of Search ............................... 345/132, 10, 213, 345/23, 127, 128, 129, 130, 131, 133, 141; 348/455–459, 503–504, 512–514, 516–517, 521, 545, 525, 555–556, 550, 542

[56] References Cited

U.S. PATENT DOCUMENTS

| | | |
|---|---|---|
| 4,453,183 | 6/1984 | Balaban et al. ........................ 358/148 |
| 4,601,010 | 7/1986 | Briscoe ..................................... 345/23 |
| 4,994,912 | 2/1991 | Lumelsky et al. ..................... 348/552 |
| 5,065,346 | 11/1991 | Kawai et al. ........................... 348/552 |
| 5,119,082 | 6/1992 | Lumelsky et al. ..................... 345/132 |
| 5,150,109 | 9/1992 | Berry ...................................... 345/132 |
| 5,287,189 | 2/1994 | Ersoz et al. . |
| 5,404,153 | 4/1995 | Kim ........................................ 345/213 |
| 5,442,406 | 8/1995 | Altmanshofer et al. . |
| 5,457,473 | 10/1995 | Arai et al. .............................. 345/132 |
| 5,537,157 | 7/1996 | Washino et al. ....................... 348/445 |

*Primary Examiner*—Xiao Wu
*Attorney, Agent, or Firm*—Joseph S. Tripoli; Joseph J. Laks; Francis A. Davenport

[57] ABSTRACT

Method and apparatus for using a wide screen television receiver operating at $2f_H$ as a VGA or SVGA monitor. The VGA or SVGA board in a computer is programmed to generate an RGB video signal representing a picture having fewer than a normal number of horizontal lines than a conventional VGA or SVGA picture having a 4:3 format display ratio, in order to define a picture having a wide format display ratio, for example 16:9. The separate synchronizing signals of the RGB video signal are converted in polarity and phase, as necessary, to a form recognizable by a video processing circuit of the wide screen television receiver.

23 Claims, 3 Drawing Sheets

EMULATION OF COMPUTER MONITOR IN A WIDE SCREEN TELEVISION

BACKGROUND OF THE INVENTION

1. Field of the Invention

This invention relates to the field of computer monitor emulation by television receivers, and in particular, by wide screen television receivers.

2. Description of Related Art

Current wide screen televisions, for example as described in published specification PCT/US91/03740, corresponding to U.S. Pat. No. 5,442,406, do not have the capability of displaying analog computer RGB signals. There is a need for a modification to current television receivers, particularly wide screen television receivers, that would enable a display of analog computer RGB inputs with separate horizontal and vertical synchronization signals.

Current wide screen television receivers, as described, can accept analog RGB inputs through a $2f_H$ (double horizontal rate scanning, for example, progressive horizontal scanning) input/output module or circuit inside the television. Such a module or circuit provides a method of interfacing external $2f_H$ inputs (either RGB or YPrPb) into the internal video signal processing signal path, downstream from the point where conventional $1f_H$ input video signals are converted for progressive $2f_H$ scanning. The synchronization signals come from either the composite sync input or y (of RGB inputs) or from the composite sync on luma (for the YPrPb inputs).

VGA computer monitors operate at a horizontal frequency of 31.47 KHz, that is, at $2f_H$. Current wide screen television receivers already have the capability of receiving and displaying analog RGB inputs at a horizontal frequency of 31.47 KHz. The problem is that a typical $2f_H$ input/output module requires composite sync for the RGB inputs rather than the separate horizontal and vertical synchronizing signals from the VGA computer inputs.

SUMMARY OF THE INVENTION

This invention teaches the procedures and circuitry necessary to display VGA and SVGA computer inputs, both graphic and text, on a wide screen television, while still maintaining all the capabilities of the wide screen television.

A method for displaying images created in a computer on a wide screen television receiver, in accordance with inventive arrangements, comprises the steps of: programming a first video circuit in the computer to use less than a normal number of horizontal lines when formulating a picture for display, the less than normal number of horizontal lines resulting in a picture having a wide format display ratio; generating in the programmed first video circuit a $2f_H$ RGB video signal indicative of the picture, including separate synchronizing signals; converting the synchronizing signals to a form recognizable by a second video circuit in the television receiver, the second video circuit being adapted for receiving a $2f_H$ RGB video signal with separate synchronizing signals; and, coupling the $2f_H$ RGB video signal and the converted synchronizing signals to the second video circuit for displaying the wide format display ratio picture on the wide screen television receiver.

A wide screen television receiver/computer monitor, in accordance with inventive arrangements, comprises: a video processing circuit in the television receiver being adapted for receiving a $2f_H$ RGB video signal with separate synchronizing signals from a source other than a computer; and, means for converting separate synchronizing signals (VGA HOR., VGA VERT.) associated with a $2f_H$ RGB video signal generated by a computer to a form recognizable by the video circuit. At least one of the synchronizing signals generated by the computer is converted to an opposite polarity or at least one of the synchronizing signals generated by the computer is shifted in phase. The $2f_H$ RGB video signal generated by the computer originates in a programmable video circuit, which is programmed to use less than a normal number of horizontal lines when formulating a picture for display, the less than normal number of horizontal lines resulting in a picture having a wide format display ratio. The programmable video circuit capable of VGA or SVGA operation. The receiver/monitor of claim further comprises means for coupling the $2f_H$ RGB video signal and the converted synchronizing signals to the video circuit in the television receiver.

DETAILED DESCRIPTION OF THE PREFERRED EMBODIMENTS

A current "off-the-shelf" wide screen television, for example as described in PCT/US91/03740, expects a negative going, composite sync input, time aligned with an associated analog RGB video input. An example of such a wide screen television receiver is the Thomson PROSCAN® wide screen television receiver, designated as chassis CTC-172, which uses a Thomson W86 (34 V) 16:9 standard commercial picture tube. The RGB video input can either be a progressive 525 line format with a horizontal line frequency of 31.47 KHz and a vertical frame frequency of 59.94 Hz, or an interlaced 1050 line format with a horizontal line frequency of 31.47 KHz and a vertical field frequency of 59.94 Hz with two fields per frame.

A VGA input can be interfaced to such a wide screen television for two principal reasons. Firstly, the horizontal line frequency of all VGA modes is 31.47 KHz. This is the same horizontal frequency as the current wide screen television. It might be difficult to change the horizontal frequency of the television to accommodate other multisync computer input modes. Secondly, although the vertical frequency varies for the different VGA modes, this can be accommodated by changing the analog zoom voltage on the vertical deflection circuit inside the television. In the VGA Graphics mode, the vertical frequency of 59.94 Hz is the same as the "Fill" mode for the television. Since the television automatically goes into the "Fill" mode (the only mode possible for RGB inputs with the current television software) when a RGB input is selected to be displayed, no change to the analog zoom voltage is necessary. In the VGA Text mode, the vertical frequency is 70.08 Hz. The increased vertical frequency results in a decreased vertical height, therefore, for the VGA Text mode to entirely fill the screen vertically, the analog zoom voltage on the vertical board needs to be increased.

The automatic sync inversion can be described as follows. The integrated vertical sync is low (a low logic level, for example 0 volts) when the vertical sync is positive going. Therefore, for the output to be negative going, the vertical sync needs to be inverted. The integrated vertical sync is high (a high logic level, for example 5 volts) when the vertical sync is negative going. Therefore, since the vertical sync is already negative going, it does not need to be inverted.

Since the separate VGA sync signals are TTL levels with either very high duty cycles (for negative going synchronizing signals) or very low duty cycles (for positive going synchronizing signals), integrating these sync signals provides TTL level signals which correspond to the polarity of the synchronizing signals. Integrating the negative going synchronizing signals produces a logic high signal while integrating the positive going pulses produces a logic low signal.

Figure 1:
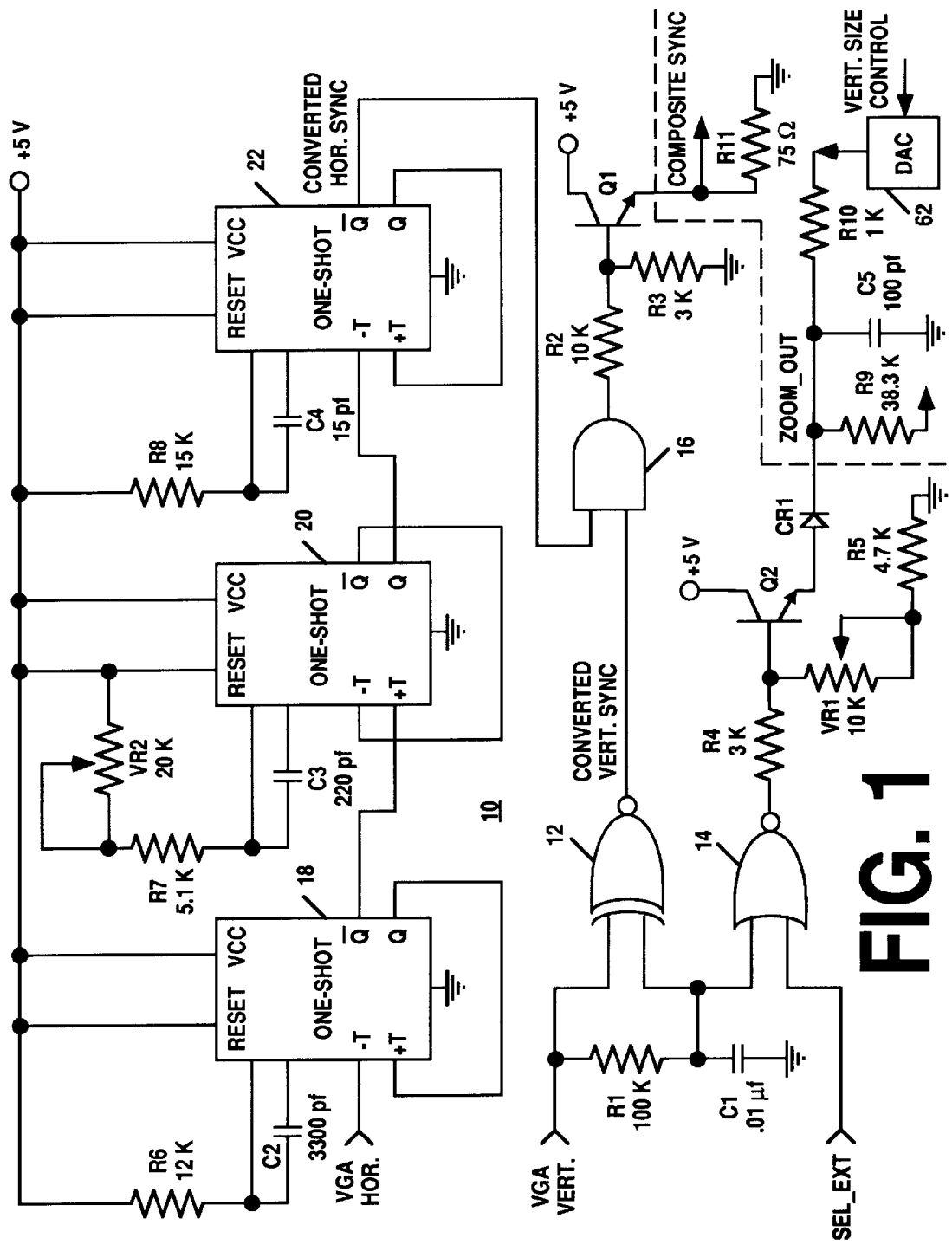
FIG. 1 is a schematic diagram of a synchronizing signal converter according to the invention.

A first embodiment of a sync converter 10 is shown in FIG. 1. The dashed line in the lower right hand corner of FIG. 1 indicates components in locations remote from the sync converter 10. The values of resistor R1 and capacitor C1, which form a suitable integrator, are chosen large enough to provide adequate integration so that the ripple voltage would not cause a change in logic state, but small enough to allow the circuit to quickly change state when the user goes from VGA Graphics to VGA Text and vice versa.

The separate vertical and horizontal synchronizing signals from the computer cannot merely be combined to form the required composite sync. This composite sync would have the wrong vertical sync polarity during the VGA Text mode. Before being combined, the vertical sync needs to be inverted during the VGA Text mode but not inverted during the VGA Graphics mode. Again, when the user goes from VGA Graphics to VGA Text and vice versa, this inversion should take place "automatically" such that no user input is required.

One input of an exclusive NOR gate 12 is the vertical sync from the computer, VGA VERT. The other input is the integrated vertical sync, from the junction of resistor R1 and capacitor C1. The output of exclusive NOR gate 12 will always be negative going vertical sync pulses.

The other aspect of generating the negative going composite sync signal concerns the horizontal pulse width and phasing with respect to the RGB analog video input. The width of the horizontal sync is wider than the television can recognize. If this pulse width is not reduced, the television would mistake these wide horizontal sync pulses as being vertical sync pulses, and the television would not synchronize itself. Accordingly, the width of the negative going horizontal sync pulses needs to be reduced before being combined with the negative going vertical sync pulses. Also, since the phasing of the horizontal sync with respect to the analog RGB video input differs from what the television is expecting, the phasing of this pulse needs to be adjusted before being combined with the negative going vertical sync pulses.

Changing the phasing and width of the negative going horizontal sync pulses can be accomplished with the use of three non-retriggerable monostable multivibrators, commonly referred to as one-shots. The width of a first one-shot 18 is less than one horizontal line wide, that is, less than 31.78 $\mu$sec. The width of the output of one-shot 18 is determined by resistor R6 and capacitor C2. By using the noted width, the first one-shot is guaranteed to trigger every horizontal line. If the width of one-shot 18 is greater than one horizontal line, then one-shot 18 would only trigger every other horizontal line. If the width of one-shot 18 is greater than two horizontal lines, then one-shot 18 would only trigger every third line, and so on. The width of a second one-shot 20 positions the horizontal sync pulse, that is, adjusts the phase of the horizontal sync pulse relative to the analog RGB video input. The width of the output pulse of one-shot 20 is determined by resistor R7, variable resistor VR2 and capacitor C3. The width of the horizontal sync pulse is controlled by the width of a third one-shot 22. The width of the output pulse of one-shot 22 is determined by resistor R8 and capacitor C4.

The horizontal and vertical sync components are logically combined in an AND gate 16. The output of AND gate 16 is negative going composite sync pulses. Therefore, the composite sync pulses will always be negative going for both VGA Graphics and VGA Text modes. The television requires this polarity (i.e., negative going) for the composite sync of the RGB input.

A voltage divider formed by resistors R2 and R3 provides an input to transistor Q1, in an emitter follower configuration. The COMPOSITE SYNC signal is an approximately 300 mV p-p negative going composite sync signal, when terminated on the 2f$_H$ input/output module 52 (see FIG. 3) by 75 ohm resistor R11. The NPN emitter follower configuration of transistor Q1 also provides the necessary current to drive to the terminating resistor R11. In the CTC-172 chassis, for example, terminating resistor R11 is accessible via the composite sync input jack located on the back of the television receiver.

The next problem is determining which VGA mode is present so the analog zoom voltage can be changed at the appropriate time. When the user goes from VGA Graphics to VGA Text, or vice versa, the analog zoom voltage preferably changes automatically to keep the screen vertically filled during the VGA Text mode. There is a method for determining which VGA mode is present. In the VGA Graphics mode, the vertical sync is negative going. In the VGA Text mode, the vertical sync is positive going. Using the polarity of the vertical sync to indicate when VGA text mode is present, the analog zoom voltage can be increased to vertically fill the screen. Further explanation of this analog zoom voltage follows below.

As noted above, the appropriate analog zoom voltage must be generated to keep the screen completely vertically filled for both the VGA Graphics and VGA Text modes. The vertical field frequency of the VGA Graphics and the expected RGB input mode are the same (i.e., 59.94 Hz), and thus, no changes to the analog zoom voltage are required. But in the VGA Text mode, the vertical field frequency is 70.08 Hz, which results in a smaller vertical scan amplitude, thus, the analog zoom voltage is increased to vertically fill the entire screen.

Figure 3:
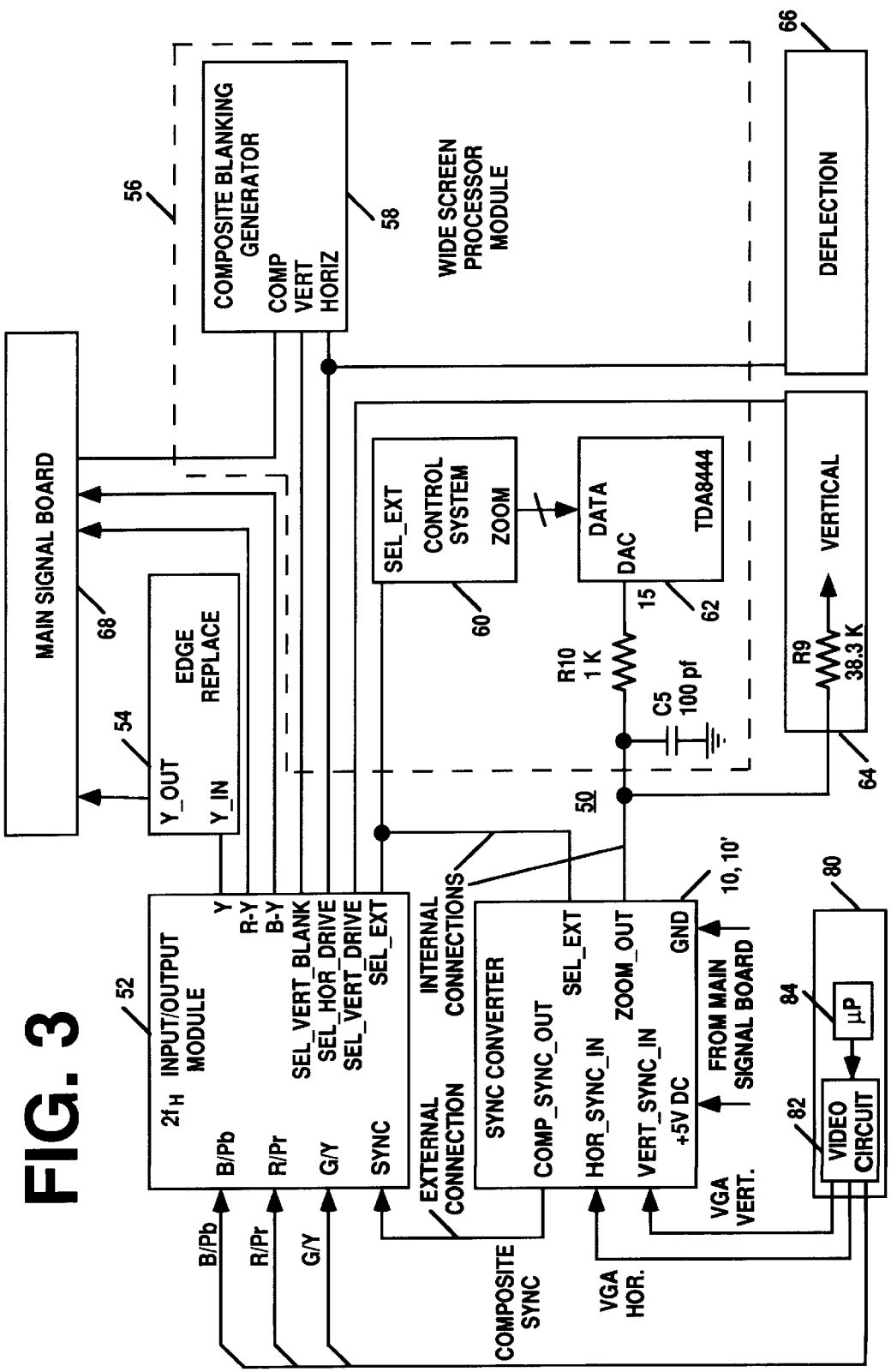
FIG. 3 is a partial system diagram of a wide screen television receiver which can be utilized with this invention.

During normal television operation, and with further reference to FIG. 3, Zoom data representing the analog zoom voltage is supplied to a digital to analog converter DAC 62 in the wide screen processor (WSP) module 56. Only when VGA Text is present, and the user selects the VGA Text to be displayed on the screen, should the analog zoom voltage be increased to vertically fill the VGA Text on the screen. Thus, this logic allows the television to operate normally (i.e., analog zoom voltage not altered) when either a VGA Text input is present, but not selected, or something other than a VGA Text is present at the RGB inputs to the wide screen television.

A logic hardware implementation uses the logic signal from the integrated vertical sync of the VGA Text Mode (i.e., low duty cycle, positive going vertical sync) and the SEL__EXT logic signal from the control system 60. Each is an input to a NOR gate 14, which generates a logic high output only when both of the inputs are low.

The integrated vertical sync will be low only when the VGA Text mode is present, and the SEL_EXT signal will be low only when the user selects the High Resolution (i.e., RGB) input to be displayed on the screen. The logic high output from NOR gate 14 is divided down by resistors R4 and R5 and variable resistor VR1. The ZOOM_OUT adjust voltage is adjusted by variable resistor VR1 and buffered by an NPN transistor Q2 in an emitter follower configuration, before being sent to resistor R9 on a vertical board 64. The output of DAC 62 in the WSP module 56 is filtered by capacitor C5 and resistor R10 before being coupled to resistor R9 in the vertical control circuit 64. When the output of the NOR gate 14 is low, the divided down voltage is not great enough to overcome the Vbe threshold of the transistor Q2. Thus, transistor Q2 is cut off, and has no effect on the analog zoom voltage.

The analog zoom adjust voltage ZOOM_OUT can reach 10 volts DC. A Schottky diode CR1 is provided in series with the emitter of transistor Q2 to protect the emitter to base junction from breaking down when the output of NOR gate 14 is low.

Figure 2:
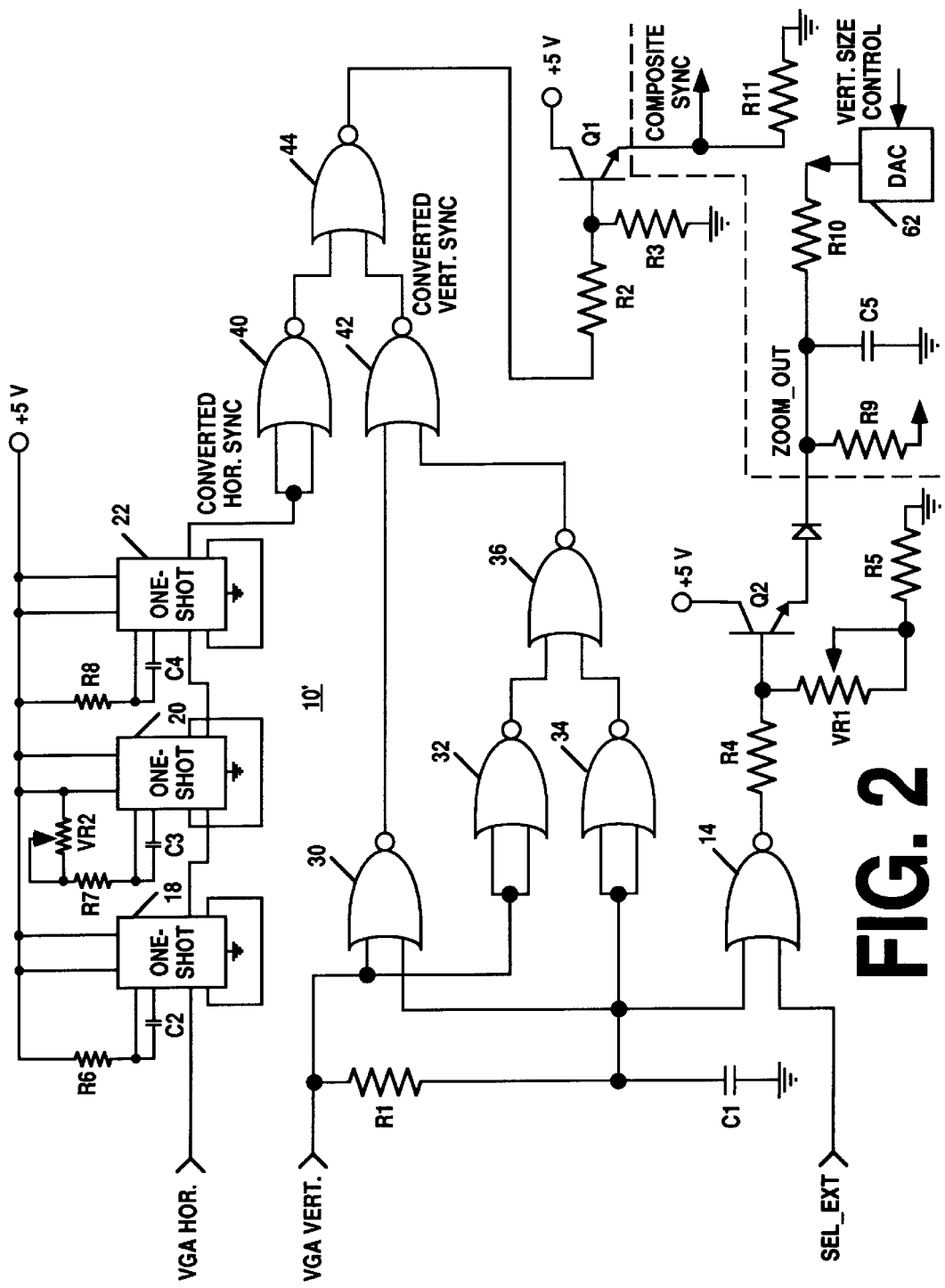
FIG. 2 is a schematic diagram of an alternative embodiment of a synchronizing signal converter according to the invention.

An alternative sync converter 10' is shown in FIG. 2. The vertical sync VGA VERT. and the integrated vertical sync are inputs to a NOR gate 30. The output of NOR gate 30 is one input to a NOR gate 42. The vertical sync VGA VERT. is also both inputs to a NOR gate 32, wired as an inverter. The integrated vertical sync is also both inputs to a NOR gate 34, also wired as an inverter. The outputs of NOR gates 32 and 34 are inputs to a NOR gate 36. The output of NOR gate 36 is a second input to NOR gate 42. The output of one-shot 22 is both inputs to a NOR gate 40, wired as an inverter. The output of NOR gate 40, which is the CONVERTED HOR. SYNC, and the output of NOR gate 42, which is the CONVERTED VERT. SYNC, are inputs to a NOR gate 44, which combines the converted sync signals. The remainder of sync converter 10' is identical to sync converter 10, and accordingly, is not explained in detail. Components which are the same as in FIG. 1 are labeled by the same reference numerals.

A partial system diagram of a wide screen television receiver 50, corresponding generally to the CTC-172, is shown in FIG. 3. FIG. 3 and the corresponding text is not intended to provide a complete description of a wide screen receiver, but is intended to illustrate the manner in which a sync converter as taught herein may be incorporated into a wide screen receiver. The sync converter circuit 10 or 10' receives sync inputs from the computer, receives the SEL_EXT signal from the control circuit 60 in the wide screen processor module 56 and supplies the converted composite sync signal to the $2f_H$ input/output module 52 and the ZOOM_OUT control voltage to the vertical circuit 64. The COMPOSITE SYNC signal is carried by an external connection. The SEL_EXT and ZOOM_OUT signals are carried by internal connections. The $2f_H$ input/output module 52 supplies selected horizontal and vertical drive signals (SEL_HOR_DRIVE and SEL_VERT_DRIVE) to the deflection circuit 66 and the vertical circuit 64, respectively. The $2f_H$ input/output module 52 also supplies the SEL_HOR_DRIVE signal and a selected vertical blanking signal (SEL-VERT_BLANK) to a composite blanking generator 58. The composite blanking generator supplies a composite blanking signal to a main signal board 68. Finally, the $2f_H$ input/output module 52 supplies luminance and color difference signals (Y, R-Y, B-Y) to the main signal board 68. The luminance signal may be routed through an edge replacement circuit 54 to improve sharpness.

A computer 80 is also shown in FIG. 3, as the source of the VGA or SVGA video signal. The computer 80 has a video processing circuit 82, which may be, for example, a VGA or an SVGA board. The video processing circuit 82 is controlled by a microprocessor 84, together with the rest of the computer functions. The video processing circuit 82 is the source of the external RGB video signal supplied to the $2f_H$ input/output module 52 and the source of the synchronizing signals supplied to the sync converter 10, 10'.

Since the VGA modes use the entire active video time, the horizontal width and the vertical height need to be reduced from their "off-the-shelf" settings for the current televisions to allow the user to see the entire text or graphics display being generated by the computer. At the same time, since the analog RGB video coming into the television via the $2f_H$ input/output module 52 bypasses the wide screen processing module 56, the VGA material displayed on the CTC-175 receiver, for example, will have an aspect ratio of 16×9. Therefore, graphics appearing "correct" on the computer monitor will appear horizontally stretched on the television since the VGA video card produces graphics and text to be displayed on a 4×3 picture tube. This problem could be overcome by programming the VGA card in the computer to output a horizontally speeded-up video signal, by a factor of 4/3. However, this would leave a portion of the screen blank, and would obviate the wide feature of the receiver. A better solution is to program the computer to output a wide format display ratio picture, for example 16:9.

Microsoft® Windows® software provides a flexible Graphical User Interface (GUI) that can function with a variety of screen sizes and resolutions. The video presentation is determined by the generic Windows Graphics Display Interface program GDI.EXE (GDI), in conjunction with specific Dynamic Line Library display driver modules, which are crafted to each specific video system.

At a more fundamental level, the Windows® GUI system runs "on top of" video BIOS software, which determines the video pixel format and timing produced by the graphics board hardware. Common display drivers include versions for VGA (640 by 480 pixels), SVGA (800 by 600 pixels), and 1024 by 768 pixels. The ratio of horizontal to vertical pixels in all these systems, which is the same as the format display ratio, is 4×3, reflecting the 4:3 aspect ratio of conventional cathode ray tubes. This arrangement can be thought of as creating square pixels, which are desirable for certain software reasons.

When the software is ported from a 4:3 display, a problem arises. The temptation is to expand horizontal scan to fill the screen; however, merely stretching the raster this way can be thought of as stretching each pixel horizontally by ⅓. Normal Windows® Program Manager icons look distorted. A more serious example is Kodak® Photo-CD Images, which may assume a square pixel shape in their transfer of real-world 35 mm images to video. Stretching pixels horizontally to fill the screen results in distorted pictures populated by horizontally elongated images. This requires both new display BIOS and Windows® display drivers, or modifications to existing software.

One method is to modify an existing set of software. Starting with a 4:3 SVGA driver, the number of vertical pixels (horizontal lines) must be reduced by a factor which yields a format display ratio of 16:9, based on a horizontal width of 800 square pixels, namely 800*(9/16)=450 pixels. The new raster is 800 by 450 pixels, that is, 450 lines of video. Accordingly, modify the contents of the Windows® video driver file. Among other things, this file "tells" the GDI software what raster format it has to work with. The GDI software complies by producing a display having fewer than the usual number of horizontal lines in SVGA format, in this case, 450 lines. Next, create a software utility to modify the contents of the video controller card's CRT controller registers. These registers control the video timing and line counts produced by the CRT controller chip hardware on the video card. The counts are changed to produce an active raster of 450 horizontal lines. Finally, the modified software is loaded at system start up, and the result is a 16:9 video display of a picture without image aspect ratio distortion. In other words, the pixels in the wide screen display can still be thought of as square. This video display can be scanned directly onto the wide screen tube without image aspect ratio distortion. In effect, the video software and hardware are instructed to format a picture directly in a wide screen format.

The reduction in the number of horizontal scanning lines will result in some reduction of vertical resolution, however, this method has been used on a Dell® 486 system to demonstrate a variety of material ranging from business software (Word®, Excel® and Powerpoint®) to Kodak® Photo CD images and Microsoft's Video for Windows®, all on a modified Thomson CTC-172 receiver using a Thomson W86 (34 V) 16:9 standard commercial picture tube, with very good results.

What is claimed is:

1. A wide screen television receiver/computer monitor, comprising:
   a video processing circuit in said television receiver adapted for receiving a 2fH RGB video signal with separate vertical and horizontal synchronizing signals having a given phase and a given polarity;
   means for converting said vertical synchronizing signal associated with said 2fH RGB video signal to have a negative polarity upon determination of a positive polarity vertical synchronizing signal and converting said horizontal synchronizing signal into a signal capable of display on said wide screen television receiver/computer monitor; and
   means for detecting a change between graphics and text modes of operation and changing a vertical size signal for enabling said 2fH RGB video signal to substantially fill said wide screen television upon detection of a change between graphics and text modes of operation.

2. The receiver/monitor of claim 1, wherein at least one of said vertical and horizontal synchronizing signals is shifted in phase by said means for converting.

3. The receiver/monitor of claim 1, wherein said 2fH RGB video signal originates in a programmable video circuit.

4. The receiver/monitor of claim 3, wherein said programmable video circuit is programmed to use a smaller number of horizontal lines than otherwise used when formulating a picture for a display having a conventional format display ratio, said smaller number of horizontal lines resulting in a picture having a wide format display ratio.

5. The receiver/monitor of claim 3, wherein said programmable video circuit is capable of VGA operation.

6. The receiver/monitor of claim 3, wherein said programmable video circuit is capable of SVGA operation.

7. The receiver/monitor of claim 1, further comprising means for coupling said 2fH RGB video signal and said converted vertical and horizontal synchronizing signals to said video processing circuit.

8. The receiver/monitor of claim 1, further comprising:
   a video display having a wide format display ratio, said video display having a vertical zoom mode; and
   means for selecting between a normal vertical picture height and a zoomed picture height indicating changes between graphics and text modes of operation and sending a control signal to said means for detecting indicative of said changes, said selecting means being responsive to a control signal generated by said converting means.

9. The receiver/monitor of claim 3, further comprising:
   a video display having a wide format display ratio, said video display having a vertical zoom mode; and
   means for selecting between a normal vertical picture height and a zoomed picture height indicating changes between graphics and text modes of operation and sending a control signal to said means for detecting indicative of said changes, said selecting means being responsive to a control signal generated by said converting means.

10. A wide screen television receiver, comprising:
    a video display having a wide format display ratio;
    a video processing circuit adapted for receiving from video signal sources other than computer-compatible video graphics adapters any 2fH RGB video signal with separate synchronizing signals having a given phase and a given polarity;
    means for identifying a phase and polarity of a synchronizing signal associated with a 2fH RGB video signal generated by a computer-compatible video graphics adapter and supplied to said television receiver;
    means for automatically changing said identified phase and polarity of said synchronizing signal to have said given phase and said given polarity for which said video processing circuit is adapted to receive, irrespective of changes in said identified phase and polarity as said computer-compatible video graphics adapter supplying said 2fH RGB video signal changes between graphics and text modes of operation;
    means for detecting changes between graphics and text modes of operation and changing a vertical size signal for enabling said 2fH RGB video signal to substantially fill the video display based upon detection of said changes between graphics and text modes of operation; and
    said video processing circuitry displaying said computer-compatible video graphics as a wide format display ratio picture on said wide screen television receiver.

11. The receiver of claim 10, wherein said video display has a vertical zoom mode and further comprising means for selecting between a normal vertical picture height and a zoomed vertical picture height as said computer-compatible video graphics adapter changes between said graphics and text modes of operation, said selecting means being responsive to a control signal generated by said identifying means and indicative of said modes of operation of said computer-compatible video graphics adapter.

12. The receiver of claim 10, wherein said programmable video circuit is programmed to use a smaller number of horizontal lines than otherwise used when formulating a picture for a display having a conventional format display ratio, said smaller number of horizontal lines resulting in a picture having a wide format display ratio.

13. The receiver of claim 11, wherein said programmable video circuit is programmed to use a smaller number of horizontal lines than otherwise used when formulating a picture for a display having a conventional format display ratio, said smaller number of horizontal lines resulting in a picture having a wide format display ratio.

14. The receiver of claim 10, wherein said computer-compatible video graphics adapter is capable of VGA operation.

15. The receiver of claim 10, wherein said computer-compatible video graphics adapter is capable of SVGA operation.

16. A method of converting a VGA signal having a conventional format display ratio to a signal capable of display on a wide screen display in a first graphics mode and a second text mode, comprising the steps of:

a) receiving a video signal having separate horizontal and vertical synchronizing signals in a first video processing circuit;

b) changing a width and phasing of the horizontal synchronizing signal to convert the horizontal synchronizing signal to a form suitable for synchronizing said wide screen display;

c) determining a positive polarity of said vertical synchronizing signal;

d) converting said vertical synchronizing signal to a negative signal polarity upon determining said positive polarity;

e) combining said converted horizontal and vertical synchronizing signals;

f) detecting a change between said first graphics mode and second text mode;

g) changing a vertical size signal responsive to detection of a change between said first and second modes;

h) coupling said video signal and said combined synchronizing signals to a second video processing circuit for displaying said video signal on said wide screen display; and i) coupling said vertical size signal to said wide screen display to enable said video signal to substantially fill said wide screen display.

17. The method of claim 16, wherein said change detected in step f) is from said first graphics mode to said second text mode.

18. The method of claim 17, wherein said step g) additionally comprises:

increasing said vertical size signal responsive to detection of said change from said first graphics mode to said second text mode.

19. The method of claim 16, further comprising the steps of:

programming the first video processing circuit to use a smaller number of horizontal lines than used for formulating a picture for a display having a conventional format display ratio, said smaller number of horizontal lines forming a picture having a wide format display ratio; and generating the video signal in the first video processing circuit, the video signal being indicative of said picture having the wide format display ratio.

20. The method of claim 19, wherein said step of generating the video signal generates a 2fH RGB video signal.

21. An interface device for receiving a VGA video signal having a conventional format display ratio and converting the VGA video signal to a signal capable of display on a wide screen display in a first graphics mode and a second text mode, said interface device comprising:

means for receiving the VGA video signal and synchronizing signals, said synchronizing signals including separate vertical and horizontal synchronizing signals;

means coupled to said receiving means for changing a width and phasing of said horizontal synchronizing signal to convert said horizontal synchronizing signal to a form suitable for synchronizing the wide screen display;

means coupled to said receiving means for determining a positive going polarity of said vertical synchronizing signal and responsive to a positive determination converting said vertical synchronizing signal to a negative going signal;

means for combining said converted vertical and horizontal synchronizing signals;

means coupled to said determining means for detecting a change between said first graphics mode and said second text mode and changing a vertical size signal responsive to said detection;

means for coupling said combined synchronizing signal and said video signal to the wide screen display; and means for coupling said vertical size signal to said wide screen display for enabling said VGA video signal to substantially fill said wide screen display.

22. The device as claimed in claim 21, wherein said means for changing said vertical size signal increases said vertical size signal upon detection of a change from said first graphics mode to said second text mode and receipt of a user generated signal indicative of selection of said second text mode.

23. The device as claimed in claim 22, wherein said means for receiving receives a picture for display having a conventional format display ratio from a VGA output device and generates therefrom a 2fH RGB video signal having a smaller number of active horizontal lines and a wide format display ratio.

\* \* \* \* \*